(12) United States Patent
Beal et al.

(10) Patent No.: US 10,968,566 B2
(45) Date of Patent: Apr. 6, 2021

(54) HYBRID CABLE FOR REINFORCING POLYMERIC ARTICLES AND REINFORCED ARTICLES

(71) Applicant: Gates Corporation, Denver, CO (US)

(72) Inventors: Daniel Beal, Columbia, MO (US); Yelena Gray, Parker, CO (US)

(73) Assignee: Gates Corporation, Denver, CO (US)

( * ) Notice: Subject to any disclaimer, the term of this patent is extended or adjusted under 35 U.S.C. 154(b) by 172 days.

(21) Appl. No.: 16/154,701

(22) Filed: Oct. 8, 2018

(65) Prior Publication Data
US 2019/0040574 A1 Feb. 7, 2019

Related U.S. Application Data

(63) Continuation of application No. PCT/US2017/026686, filed on Apr. 7, 2017.
(Continued)

(51) Int. Cl.
*D07B 1/06* (2006.01)
*D01F 9/12* (2006.01)
(Continued)

(52) U.S. Cl.
CPC ............ *D07B 1/0613* (2013.01); *D01F 9/12* (2013.01); *D07B 1/005* (2013.01); *D07B 1/062* (2013.01);
(Continued)

(58) Field of Classification Search
CPC ...... D07B 1/005; D07B 1/0613; D07B 1/062; D07B 5/006; D07B 2201/1016;
(Continued)

(56) References Cited

U.S. PATENT DOCUMENTS

| 4,034,547 A | 7/1977 | Loos |
| 4,823,857 A | 4/1989 | Orjela et al. |

(Continued)

FOREIGN PATENT DOCUMENTS

| CN | 202175924 U | 3/2012 |
| CN | 102767104 A | 11/2012 |

(Continued)

OTHER PUBLICATIONS

Federal Service on Intellectual Property, Federal State Budgetary Enterprise "Federal Institute of Industrial Property" (FIPS) Search Report, RU Application No. 2018139090, Date of completion of the search: Apr. 24, 2019.

(Continued)

*Primary Examiner* — Shaun R Hurley
(74) *Attorney, Agent, or Firm* — Alyssa K. Sandrowitz, Esq.

(57) ABSTRACT

A hybrid cable having a core and a wrap; the core made from a carbon fiber yarn or bundle of carbon fiber strands or yarns; and the wrap made of a plurality of metal wires helically wrapped around the core, the plurality of metal wires laid side by side without crossing each other. The fibers, yarns, or core may be treated with polymeric sizing, adhesive, or binder. The wire may be steel and may have a coating such as brass or zinc plating, or a polymeric coating or treatment. The hybrid cable is useful for reinforcing composite articles such as belts, track, or hose.

20 Claims, 4 Drawing Sheets

Related U.S. Application Data (60) Provisional application No. 62/320,446, filed on Apr. 8, 2016.

(51) Int. Cl.
  *D07B 5/00* (2006.01)
  *D07B 1/00* (2006.01)
  *F16G 1/08* (2006.01)
  *B60C 9/00* (2006.01)
  *F16L 11/08* (2006.01)

(52) U.S. Cl.
  CPC .............. *D07B 5/006* (2015.07); *B60C 9/005* (2013.01); *D07B 2201/102* (2013.01); *D07B 2201/1016* (2013.01); *D07B 2201/1052* (2013.01); *D07B 2201/1092* (2013.01); *D07B 2201/2011* (2013.01); *D07B 2201/2012* (2013.01); *D07B 2201/2033* (2013.01); *D07B 2201/2037* (2013.01); *D07B 2201/2039* (2013.01); *D07B 2201/2056* (2013.01); *D07B 2201/2066* (2013.01); *D07B 2201/2087* (2013.01); *D07B 2205/20* (2013.01); *D07B 2205/3007* (2013.01); *D07B 2205/3025* (2013.01); *D07B 2401/206* (2013.01); *D07B 2401/2055* (2013.01); *D07B 2501/20* (2013.01); *D07B 2501/2076* (2013.01); *F16G 1/08* (2013.01); *F16L 11/088* (2013.01)

(58) Field of Classification Search
  CPC ...... D07B 2201/102; D07B 2201/1052; D07B 2201/1092; D07B 2201/2011; D07B 2201/2012; D07B 2201/2033; D07B 2201/2056; D07B 2201/2066; D07B 2201/2087; D07B 2205/20; D07B 2205/3025; D07B 2401/2055; D07B 2401/206; D07B 2501/20; D07B 2205/3007; D01F 9/12; F16G 1/08; B60C 9/005
  See application file for complete search history.

(56) References Cited

U.S. PATENT DOCUMENTS

| | | | |
|---|---|---|---|
| 6,272,830 B1 * | 8/2001 | Morgan | D07B 1/0613 152/451 |
| 6,334,293 B1 | 1/2002 | Poethke et al. | |
| 6,412,263 B1 | 7/2002 | Lee et al. | |
| 7,814,740 B2 | 10/2010 | Imanishi et al. | |
| 9,309,620 B2 | 4/2016 | Amils et al. | |
| 2002/0174645 A1 | 11/2002 | Nguyen et al. | |
| 2005/0279074 A1 * | 12/2005 | Johnson | H01B 13/0235 57/212 |
| 2007/0169458 A1 * | 7/2007 | Schwung | D02G 3/38 57/210 |
| 2009/0159171 A1 | 6/2009 | Volpi | |
| 2009/0194215 A1 | 8/2009 | Daghini et al. | |
| 2009/0294009 A1 | 12/2009 | Barguet et al. | |
| 2010/0065178 A1 | 3/2010 | Imhoff et al. | |
| 2010/0267863 A1 * | 10/2010 | Furusawa | F16G 1/28 523/200 |
| 2011/0198008 A1 | 8/2011 | Pottier et al. | |
| 2011/0237374 A1 * | 9/2011 | Nakao | C08K 5/098 474/205 |
| 2013/0025759 A1 | 1/2013 | Igarashi et al. | |
| 2013/0059690 A1 * | 3/2013 | Di Cesare | F16G 1/08 474/205 |
| 2013/0225346 A1 * | 8/2013 | Gibson | F16G 1/08 474/260 |
| 2015/0122395 A1 * | 5/2015 | Misani | B60C 9/0007 152/556 |
| 2015/0136295 A1 * | 5/2015 | Barguet | D07B 7/022 152/527 |
| 2015/0191332 A1 | 7/2015 | Kere | |
| 2015/0233027 A1 | 8/2015 | Sung et al. | |
| 2016/0318343 A1 * | 11/2016 | Daghini | B60C 11/00 |
| 2017/0043979 A1 | 2/2017 | Kucharczyk et al. | |

FOREIGN PATENT DOCUMENTS

| | | |
|---|---|---|
| CN | 103526619 A | 1/2014 |
| CN | 102635003 B | 2/2015 |
| CN | 204355905 U | 5/2015 |
| CN | 204589686 U | 8/2015 |
| EP | 1980657 B1 | 8/2015 |
| JP | 60124506 A | 7/1985 |
| KR | 100787761 B1 | 12/2007 |
| KR | 1020110070217 A | 6/2011 |
| RU | 2243053 C1 | 12/2004 |
| WO | 2006128494 A1 | 12/2006 |
| WO | 2009080077 A1 | 7/2009 |
| WO | 2016096395 A1 | 6/2016 |
| WO | 2016120237 A1 | 8/2016 |

OTHER PUBLICATIONS

European Patent Office; International Search Report; application No. PCT/US2017/026686; dated Jun. 20, 2017.

European Patent Office; International Preliminary Report on Patentability; application No. PCT/US2017/026686; dated Oct. 18, 2018.

* cited by examiner

HYBRID CABLE FOR REINFORCING POLYMERIC ARTICLES AND REINFORCED ARTICLES

BACKGROUND OF THE INVENTION

This invention relates generally to multi-component cable useful for reinforcement of polymeric articles, more particularly to steel-wire and carbon-fiber, hybrid cable for reinforcing elastomeric or plastic products such as reinforced thermoplastic-elastomer or rubber articles, including reinforced articles such as belts, hose and track.

U.S. Pat. No. 7,814,740 B2 discloses a cord for rubber reinforcement.

U.S. Pat. Publ. No. 2015/0233027 A1 discloses a hybrid cord for tire.

U.S. Pat. No. 6,334,293 B1 discloses a steel cord with polymer core.

SUMMARY

The present invention is directed to systems and methods which provide a hybrid cable of steel wire wrapped around a carbon fiber core. The hybrid cable may provide reduced weight at comparable or increased strength and increased flexibility compared to conventional all-metal cables or wire ropes. The invention is also directed to hose, belts, and other reinforced products incorporating the hybrid cable.

The hybrid cable includes a core and a wrap; the core formed from a carbon fiber yarn or bundle of carbon fiber yarns; and the wrap having a plurality of metal wires helically wrapped around the core, the plurality of metal wires laid side by side without crossing each other. The wrap preferably may be a single layer of metal wires. The plurality of metal wires may be laid side by side in a layer, generally filling the layer without space between wires. Alternately, the plurality of metal wires may be laid side by side in a layer, not completely filling the layer and with some space between the wires.

The core may advantageously include a treatment such as a polymer-based composition which at least partially penetrates the interstices between the carbon fibers of the core. Alternately, the core may have no treatment other than an optional sizing on the carbon fibers.

The carbon fiber yarn of the core may be in a cabled construction of a plurality of carbon fiber yarns each twisted with a first twist multiplier in a first twist direction and then combined by twisting together with a second twist multiplier in a second twist direction. The second twist direction may be opposite the first twist direction. The first and second twist multipliers may be approximately equal, or the second may be greater than the first. E.g., a ratio of second to first twist multiplier may be in the range of 2 to 6 or about 4 to 5.

The direction of wrapping the wires may be the same as the first twist direction. The direction of wrapping the wires may be the opposite of the first twist direction.

The core may be a folded bundle of carbon fiber filaments or yarns, having only a first twist direction. The direction of wrapping the wires may be the same or opposite the direction of folding of the core.

The wire may be carbon steel or stainless steel and may have a coating such as brass, zinc, copper, tin, or a polymer or polymer-based coating. The hybrid cable may be coated with a polymeric coating or embedded in a polymeric material or materials. Alternately, the hybrid cable may be uncoated.

The invention is also directed to a composite article comprising a polymeric body with the inventive hybrid cable embedded in the polymeric body. The material of the polymeric body may penetrate between the wires and may be in contact with or penetrate into the core at least partially. Examples of such composite articles include a hybrid-cable-reinforced hose, belt, or track for a track-driven vehicle.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
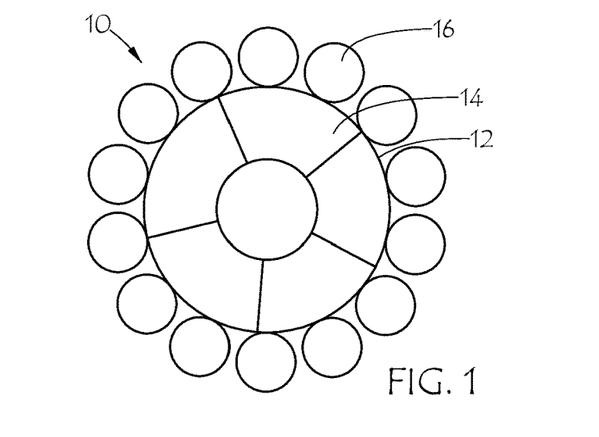
FIG. 1 is a schematic cross sectional representation of a hybrid cable according to an embodiment of the invention.

The hybrid cable of the present invention has a carbon fiber cord as the core and steel wires wrapped around the core. FIG. 1 shows a representation of a cross section of an embodiment of the hybrid cable. In FIG. 1, hybrid cable 10 includes core 12 which is illustrated as a cord made up of a bundle of six strands 14. The six strands 14 are each a bundle of carbon fibers. Core 12 is wrapped with fourteen wrap wires 16. The fourteen individual wrap wires 16 are arranged in a single layer around the core, so they do not cross each other. The fourteen wrap wires 16 are each a single, solid wire, and therefore, they are preferably not a bundle of more than one wire, i.e. not a "strand." The wrap wires are helically wrapped around the core, laying side-by-side in parallel fashion without crossing each other, i.e., "parallel lay." Adjacent wrap wires may touch each other, or there may be a separation or gap between adjacent wrap wires, as illustrated in FIG. 1. It should be understood that FIG. 1 is not drawn to scale and that the shapes are representative, not necessarily exact. For example, the shapes of strands 14 are highly idealized in FIG. 1. The center strand does not necessarily indicate a permanent center strand, as it could migrate to other positions along the length of the core. The section shape of wires 16 could be slightly out of round due to manufacturing tolerances or appear elliptical in a cable cross section due to the helix angle of the wire. Alternately, the wires could be flattened, or have another desired shape instead of generally round as shown.

The following definitions are used herein and in the claims.

"Base Yarn" or "singles yarn" refers to a bundle of filaments or fibers in the form as received from a base-yarn manufacturer, which may include twisted yarn or yarn with no twist. "Strand" or "yarn" or "ply" refers to a base yarn or yarns that have been folded or twisted or plied as an intermediate step in forming a cord. "Strand" thus refers to one of a number of yarns that are twisted together to form a cord. "Folded" refers to a bundle of one or more yarns, each of which has minimal or no initial twist, and which are twisted together in a first direction. Generally in the art of wire rope, similar terminology is used. The smallest component or basic element of a wire rope is the individual "wire." The strands that are said to make up wire rope generally include a number of wires laid around a center wire. Finally, a number of strands of wire are typically wrapped around a core to make a wire rope. However, in this case, the wrap wires are single, individual wires, so they will not be called strands herein. "Cord" refers to one or more strands, plies, or yarns that have been twisted or plied together in a final step in forming the cord for the core. "Cable" or "Hybrid Cable" refers to a rope-like structure including a core carbon fiber cord wrapped with wires. "Wires" are metal filaments of generally round cross section which can be combined to make cables, wire ropes, or more specifically, wrapped around a core to form the hybrid cables of the invention.

The term "twist multiplier" or "TM" will be utilized to describe the twist feature as it applies to the practice of the present invention, and is defined as the ratio of the turns per inch (TPI) to the square root of the yarn count. Yarn count is defined as the ratio of 5315 to the end denier in grams per 9000 meters. Thus, the following equation defines the twist multiplier:

$$TM = \frac{TPI}{\sqrt{5315/denier}}.$$

The carbon fiber cord used in the core of the hybrid cable may be a single-tow base yarn (or a singles yarn) of minimal or no twist, or it may be a plied construction of more than one base yarn. The carbon fiber cord may be made up of a number of strands of carbon fiber. Each strand may be made up of one or more base yarns which may have a first twist amount and twist multiplier in a first twist direction. The strands may be plied or combined to form the cord, with the strands twisted together with a second twist amount and a second twist multiplier. Generally the number of base yarns and strands in the cord may be chosen to give any desired size of cord for use in a hybrid cable. For reinforcement applications in flexible polymeric composite articles, with cable diameters up to about 8 mm or so, some useful ranges for the hybrid cable design parameters can be stated.

Regarding the design of the carbon fiber core, the strands may be made from carbon fiber singles yarns ranging from 3 k to 24 k or more (based on conventional filament count). The strands may be made up of from one to eight of such yarns. The first twist amount may be zero or from 0.3 to 3.0 tpi (twists per inch), or 10 to 120 tpm (twists per meter). The strands can be plied with a second twist amount of zero or in the same range, in the same twist direction as the first twist of the strands or in the opposite direction of the first twist of the strands, but preferably the second twist direction is opposite the first twist direction. Preferably, the second twist amount is greater than the first twist amount. Preferably the second twist multiplier is greater than the first twist multiplier. The ratio of second twist to first twist may be in the range of 2 to 6 or from about 4 to 5. Alternately, the first and second twist multipliers may be approximately equal. Alternately, the core may be a folded bundle of carbon fiber filaments or yarns, i.e., the singles yarn or yarns may be folded together with a single twist direction to form the core.

To describe the number of base yarns and strands used in the construction of cords, the following convention will be followed herein: "y–n/m"=an integer number "n" of a base yarn of "y" filaments per end forms each of the "m" strands of the cord. Thus, the total strand size after the first twist step is the product "y" times "n". The total cord size (filament count) after the second twist step is the product "y" times "n" times "m". Thus, the core cord of the example shown in FIG. 1, assuming the strands each have 12 k (12,000) filaments, would be a 12 k-⅙ cord construction, with 72 k for the total filament count.

The methods and machinery used for twisting and plying the strands and the cord are not particularly limited. Suitable textile twisting machines include for example a ring twister, a 2-for-1 twister, a direct cabler, and any other twister known in the art.

The carbon fiber used in the cord may include a sizing applied by the carbon fiber manufacturer to enhance processability or performance. Sizing is generally applied at about 1% by weight. Any of the commercially available sizings, or none, may be specified for use on the carbon fiber for the hybrid cable depending on the desired cord handling properties, compatibility with subsequent treatments, or performance characteristics. In one embodiment, the core has no additional treatment besides the sizing.

The carbon fiber cord for the hybrid cable may advantageously be treated with one or more subsequent treatment compositions utilizing any suitable and/or conventional materials and application processes, in order to protect the fibers, to bind them together, or to establish or improve their adhesion to the surrounding polymer constituents of an article. For example the cord may be treated with an adhesive, or adhesives, to bond the filaments to each other and to promote the adhesion of the cord to the elastomeric portion of the article. As a non-limiting example, the cord could be first treated (or only treated) with a primer, which could be either aqueous-based or solvent-based, such as a polyisocyanate, polyurethane, or an epoxy compound. The primed cord (or an un-primed cord) could be then treated with another suitable adhesive such as resorcinol formaldehyde latex (RFL), or other polymer-based formulation. After each treatment, the cord is generally passed through an oven or a series of ovens, typically at temperatures from 100° C. to 300° C., to dry or cure the treatments. The treatment may add from 5% to 30% to the weight of the cord. Optionally the cord could be then treated with an additional overcoat adhesive, e.g., a mixture of high emulsions, pigments and curatives in a water-based medium, or a mixture of pigments and curatives with dissolved polymers in a solvent solution, or other suitable rubber cements, for additional adhesion improvement or binding. The overcoat could add from 2% to 10% to the weight of the cord. One or more of the above treatments could be applied to the base yarn or the individual strands (before or after twisting) instead of (or in addition to) the final cord. The treatments may be applied by dipping, spraying, wiping, pultruding, or the like. All treatments mentioned above may be solvent-based, aqueous, thermoplastic or thermoset. The treatment may at least partially penetrate or fill the interstices between the carbon filaments of the core.

Regarding the wrap wires, any desired number of wrap wires may be used, but preferably from four to twenty wrap wires are used. The coverage of the core by the wrap wires will depend on the diameter of the core, the diameter of the wrap wires, the number of wires, and the lay length. Lay length is generally used in the wire rope industry to describe the rate of wrapping or helix angle of the wrapping wires, instead of the tpi or tpm (turns or twists per inch or meter) used in textile cord constructions. Lay length is the distance along the core in which a wire completes one full wrap (360°). Generally, the wrap wires may completely cover the core, or there may be spaces or gaps between wires.

Figure 2:
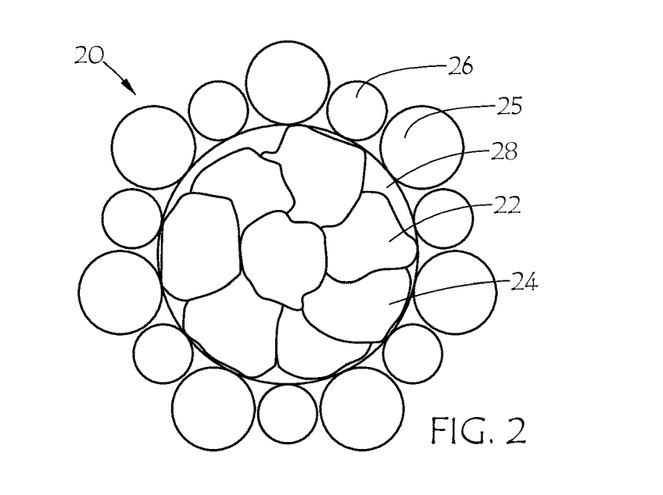
FIG. 2 is a schematic cross sectional representation of a hybrid cable according to another embodiment of the invention.

The wrap wires may be all of the same diameter as indicated in FIG. 1. Alternately, wires of more than one diameter may be used. FIG. 2 illustrates a hybrid cable comprising an eight-strand core and a so-called Warrington wire wrap using two diameters of wrap wires alternating around the core. In FIG. 2, hybrid cable 20 has core 22 made up of eight carbon fiber strands 24, wrapped with smaller diameter wire 26 alternating with larger diameter wire 25. Other configurations may be used, including additional layers of wires, Seale construction, filler wire constructions, and the like. The core may include a coating or core treatment 28 as described above.

Figure 3:
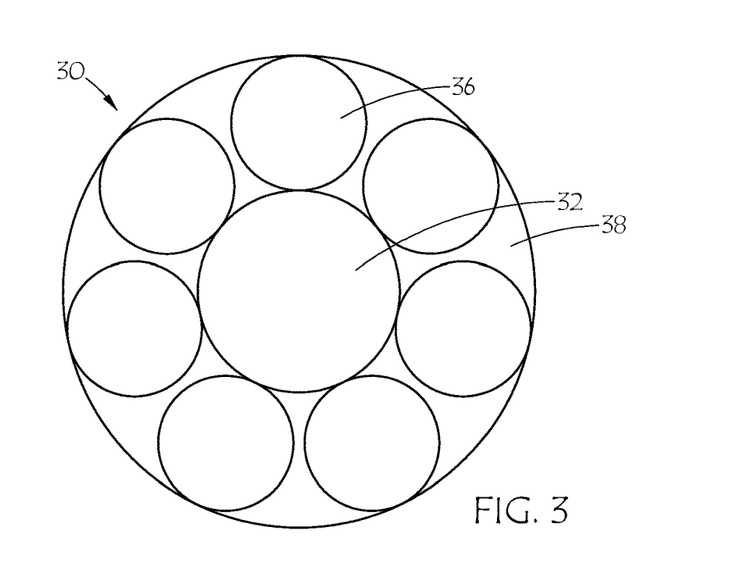
FIG. 3 is a schematic cross sectional representation of a hybrid cable according to another embodiment of the invention.

FIG. 3 illustrates a third embodiment of a hybrid cable. In FIG. 3, hybrid cable 30 has a single ply carbon fiber core 32 wrapped by 7 wrap wires 36. Cable Treatment 38 may coat or encapsulate the entire cable as described further below.

The direction of wire wrapping may be either direction, but preferably, the wrap direction of the wire is the same direction as the first twist direction in the core, or opposite the second twist direction of the core. The wire may be produced, for example by drawing rod, using any equipment known in the art.

The wire may be carbon steel or stainless steel. The wire may have a coating for adhesion or for corrosion protection, for example, brass, bronze, tin, copper or zinc plating or an organic coating material such as a silane coupling agent or epoxy sizing or a polymer-based formulation.

To maximize the weight reduction derived from replacing a metal-core with carbon fiber cord, a single layer of wrap wire with relatively small wire diameter or diameters relative to the core diameter is preferred. The theoretical weight reduction potential going from a metal core to a carbon fiber core of the same diameter is relatively easy to calculate from the densities of carbon fiber cord and metal wire, the number and diameters of wrap wires, and the core diameter. For example, if the core and wrap wires are about the same diameter, then six wires will fill the wrap layer and the potential weight reduction is only about 11%. However if the wrap wires are about ⅔ the diameter of the core wire, then seven wires will complete the wrap layer and the potential weight reduction is about 19%. If the wrap wires are about ¼ the diameter of the core wire, then fourteen wires will fill the wrap layer and the potential weight reduction goes up to about 40%.

Tables 1 and 2 provide some Examples ("Ex.") of hybrid cables and some Comparative Examples ("Comp. Ex.") of conventional wire rope to illustrate the potential for weight savings at comparable strength, and to illustrate the variety of hybrid constructions contemplated. Comp. Ex. 1 is a standard 1×19 wire rope (1+6+12). In some exemplary embodiments, represented by Ex. 2 and Ex. 6, the hybrid cable may have a carbon fiber core diameter in the range 2.00-3.00 mm, and the cable diameter may be in the range 3.00-4.00 mm, and the single layer, wrap wire diameter may be in the range 0.50 to 1.00 mm. Such a hybrid cable, could be around 30% lighter than a comparable all metal wire rope, represented by Comp. Ex. 1 and Comp. Ex. 5, but may have equivalent or better tensile strength and modulus. Some of the examples are based on actual measurements, while others are predictions, estimates or extrapolations based on experience with similar materials. These examples should be considered estimates of the properties possible with hybrid cables of the present invention.

In other embodiments, represented by Ex. 4, the hybrid cable may have a carbon fiber core diameter in the range 0.5-1.00 mm, and the cable diameter may be in the range 1.00-2.00 mm, and the single layer, wrap wire diameter may be in the range 0.30 to 0.80 mm. Such a hybrid cable as Ex. 4 may be nearly 20% lighter than a comparable all metal wire rope, represented by Comp. Ex. 3, but may have equivalent or better tensile strength and modulus.

In other embodiments, represented by Ex. 7 to Ex. 9, the hybrid cable may have a carbon fiber core diameter in the range 2-5 mm, and the cable diameter may be in range 3-6 mm, and the single layer, wrap wire diameter may be in the range 0.50 to 1.0 mm. Such a hybrid cable could be lighter by as much as 50% or more compared to an all metal wire rope of comparable diameter. Alternately, a hybrid cable of similar weight to a wire rope could have much higher strength, as can be seen by comparing Ex. 9 (of unknown actual strength, but expected to be much higher than 20 kN) to Comp. Ex. 5.

Ex. 6 in Table 2 represents a Warrington wrap, hybrid cable utilizing seven each of two diameters of wrap wires, namely of 0.56 and 0.77 mm in diameter, alternating around the core. Comp. Ex. 5 is a conventional 1×24 W wire rope. Likewise, other common types or arrangements of wire wrap are envisioned.

TABLE 1

|  | Comp. Ex. 1 | Ex. 2 | Comp. Ex. 3 | Ex. 4 |
| --- | --- | --- | --- | --- |
| Type | Wire rope | Hybrid cable | Wire rope | Hybrid cable |
| Construction[1] | 1 × 19 | 12k – 1/6 + 12 (0.70) | 1 (0.84) + 7 (0.56) | 12k – 1 + 7 (0.56) |
| Core Diameter (mm) | 2.15 | 2.3 | 0.84 | 0.838 |
| Overall Diameter (mm) | 3.55 | 3.7 | 1.96 | 1.96 |

TABLE 1-continued

|  | Comp. Ex. 1 | Ex. 2 | Comp. Ex. 3 | Ex. 4 |
|---|---|---|---|---|
| Linear Density (g/m) | 59 | 43 | 18 | 14.7 |
| Weight savings (%) | — | 27 | — | 19 |
| Tensile Strength (kN) | 17.4 | 17.8 | 5.5 | 5.3 |

[1]wire diameter in parentheses is in mm.

TABLE 2

|  | Comp. Ex. 5 | Ex. 6 | Ex. 7 | Ex. 8 | Ex. 9 |
|---|---|---|---|---|---|
| Type | Wire rope | Hybrid cable | Hybrid cable | Hybrid cable | Hybrid cable |
| Construction[1] | 1× 24 W | 96k + 7 (0.77)/ (0.56) | 48k + 13 (0.56) | 120k + 13 (0.76) | 240k + 20 (0.56) |
| Core Diameter (mm) | 2.7 | 2.7 | 1.93 | 3.1 | 4.3 |
| Overall Diameter (mm) | 3.87 | 3.80 | 3.05 | 4.6 | 5.4 |
| Linear Density (g/m) | 74.8 | 52.8 | 31.4 | 61 | 67 |
| Weight savings (%) | — | 31 | 28 | 42 | 56 |
| Tensile Strength (kN) | 20.4 | 19.4 | 13.0 | 20.9 | — |

[1]wire diameter in parentheses is in mm.

Figure 4:
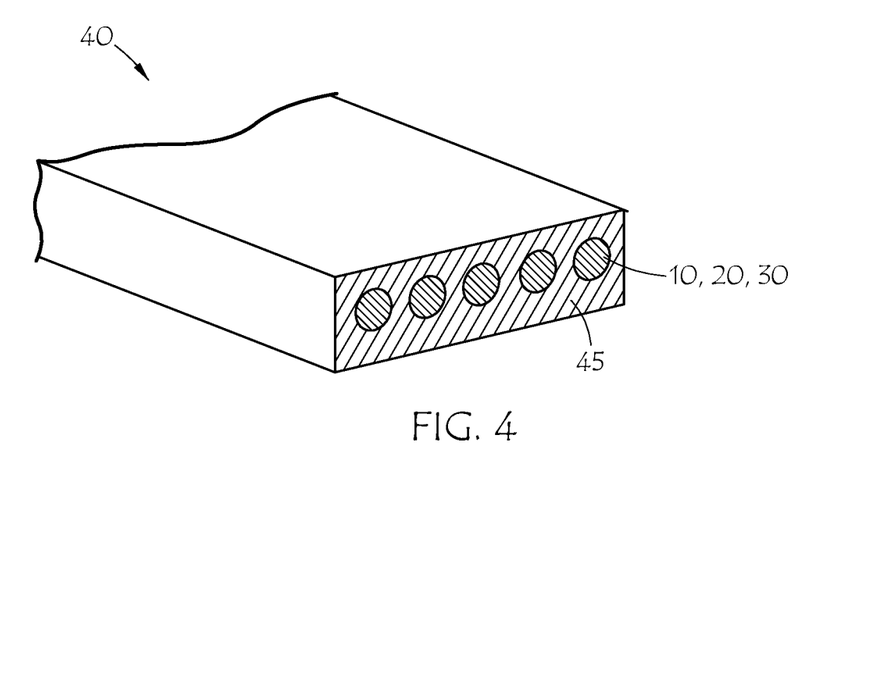
FIG. 4 is a partially fragmented perspective view of a belt with a hybrid cable reinforcement.
Figure 5:
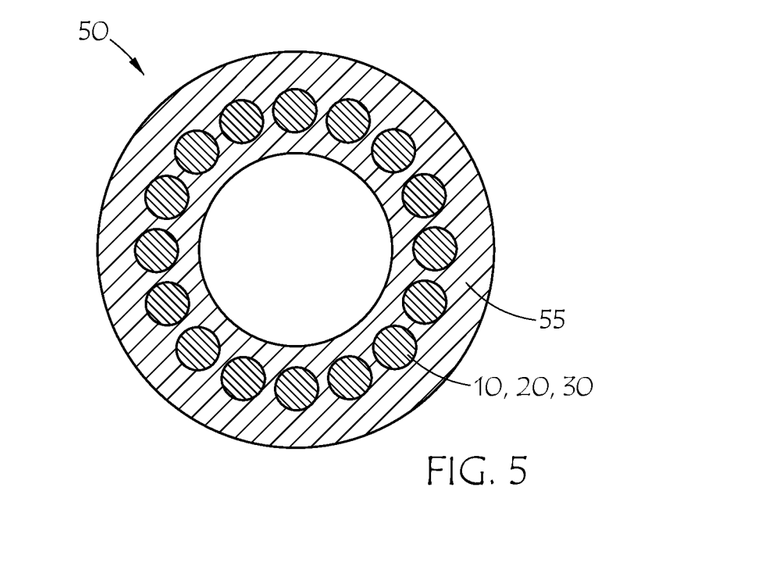
FIG. 5 is a cross sectional view of a hose with a hybrid cable reinforcement.

The hybrid cable has many potential uses, such as replacing wire rope or cable wherever reduced weight may be desirable. Hybrid cable can be flexible enough for use as a tensile member in dynamic composite articles such as belts, track, or hose. "Belts" includes flat belts, V-belts, round belts, ribbed or other profiled belts, and toothed belts, whether endless or open-ended, used for example to transmit mechanical power, motion control, transport, and the like. FIG. 4 illustrates belt 40 having hybrid cable 10, 20, 30 embedded as a tensile member in polymeric belt body material 45. "Track" refers to various belt-like endless tracks used to drive vehicles such as snow-mobiles, construction equipment, and agricultural equipment. "Hose" includes hydraulic hose, transfer hose, and the like. FIG. 5 illustrates cable-reinforced hose 50 having hybrid cable 10, 20, 30 embedded as reinforcement in polymeric hose body material 55.

The hybrid cable may be coated with polymeric material or adhesive treatment for protection or for compatibility with the polymeric body of a composite article in which the cable may be embedded for reinforcing the article. The external coating may be applied using similar methods as the cord treatments described above. The material of the polymeric body may penetrate between the wires and may come in contact with the core or penetrate into the core at least partially. Thus, the space between wrap wires may allow for mechanical adhesion to the polymeric body of the composite article.

A polymeric article may be based on a rubber composition which is generally compounded with various fillers, antidegradants, and curatives, etc. and vulcanized in the final article shape. Polymeric articles may be based on thermoplastics or thermoplastic elastomers, which may also be compounded for particular properties. The composite polymeric articles may include multiple polymeric materials, for example in different layers, or various other types of reinforcements such as fibers or textiles.

Figure 6:
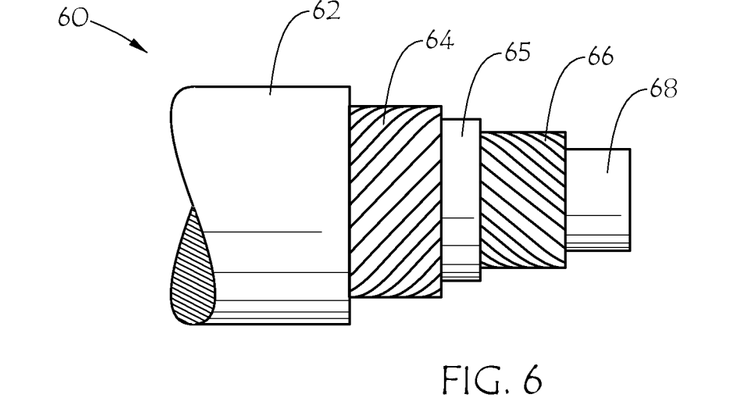
FIG. 6 is a partially fragmented view of a hose with two layers of hybrid cable reinforcement.
Figure 7:
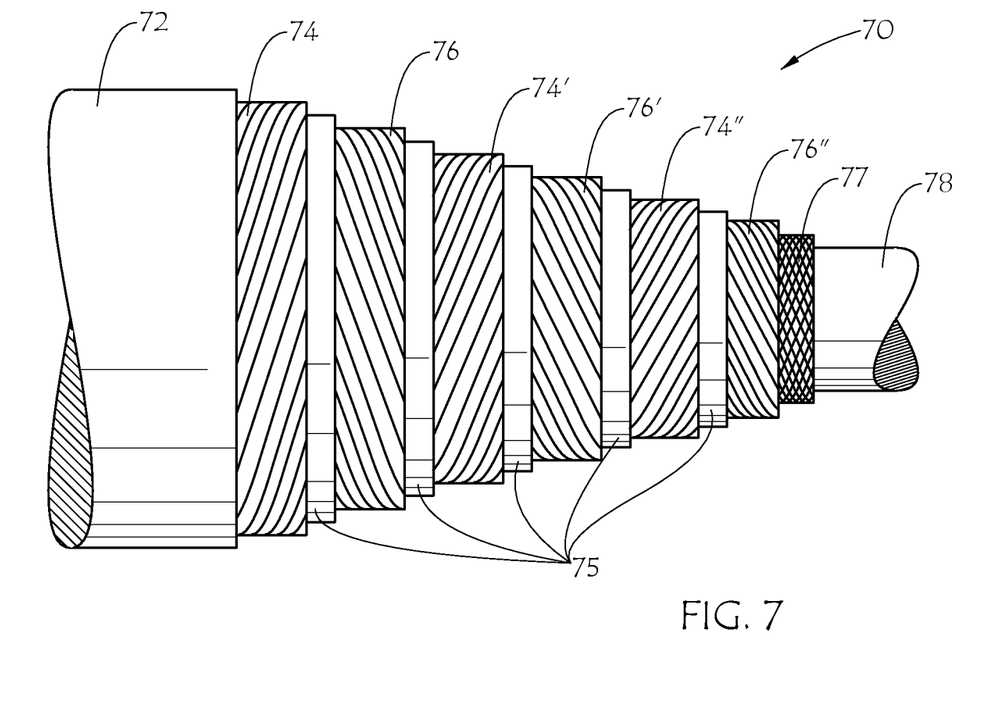
FIG. 7 is a partially fragmented view of a hose with six layers of hybrid cable reinforcement.

In other embodiments, such as the hose embodiments illustrated in FIGS. 6 and 7, the hybrid cable may advantageously have a carbon fiber core diameter in the range 0.5-1.00 mm, and the cable diameter may be in the range 0.75 or 1.00 up to about 2.00 mm, and the single layer, wrap wire diameter may be in the range from 0.15 or 0.20 or 0.30 mm up to 0.80 mm. A specific example of such a hybrid cable is Ex. 4 above. The hybrid cable is primarily used in relatively larger hose sizes where wire reinforcement is impractical. The practical limit for wire reinforced hose is a wire diameter of about 0.8 or 0.9 mm maximum. Thicker wire may be difficult to process, exhibit fatigue issues, and tensile strength problems. Then, cable is needed for larger diameter hose reinforcements. Such hoses requiring high working pressures may benefit from the present invention. Included, for example, are hydraulic hose and various oil- and gas-field hose such as blow-off preventer hose, rotary drilling hose, and the like. The hydraulic hose may include 2 to 6 spiraled hybrid cable layers, preferably in even numbers. The hydraulic hose may have a nominal inside diameter in the range from ¾ inch to about 3 inches.

Oil field hose generally may have larger nominal inside diameters, for example, in the range from about 2-inches to about 6-inches. The hybrid cable for these hose applications may advantageously be in the range from about 2 mm and up, or from 2 mm to 4 mm. About 3.5-mm hybrid cable may advantageously be used to build these sizes. Ex. 2 and Ex. 6 above are examples of a suitable hybrid cable construction for oil-field hose, as are Ex. 7-9. Higher working pressure requirements for hydraulic or oil-field hose require more layers of hybrid cord reinforcement, preferably in the range of from 2 to 6 or from 2 to 8 layers.

The inventive hose may include one or multiple additional layers. The hose may have friction layers, layers of rubber and/or fabric between each layer of hybrid cable to prevent friction between cable portions. The hose may have one or more fabric layers for example as additional reinforcement or to support the cable during hose building. The hose may have one or more of inner tube layers, outer cover layers, protective outer layers, or the like, which may be plastic or elastomeric, or textile. The hybrid cable is preferably applied by spiraling, but may be applied by braiding. The hybrid cable may be applied by conventional methods with conventional design parameters, including using the neutral angle for the spiraling of the hybrid cable.

Possible hose construction are illustrated in FIGS. 6 and 7. The embodiment in FIG. 6 shows hose 60 with outer cover 62, two spiraled reinforcing layers 64 and 66 made of hybrid cable and wrapped in opposite directions, and inner tube 68. In between the reinforcing layers 64 and 66 is friction layer 65. The composition of the inner tube, outer cover and friction layer may be any of the compositions described herein.

FIG. 7 shows hose 70 with outer cover 72 and inner tube 78. There are three pairs of spiraled cable layers, with layers 74, 74', and 74" spiraled one way, and layers 76, 76', and 76" spiraled the opposite direction. In between each of the hybrid cable layers are friction layers 75. Included in hose 70 is fabric breaker layer 77 between inner tube 78 and the first applied cable layer 76". The layer compositions may be according to any of the descriptions herein.

FIG. 4 showed flat belt 40, which could be representative of various specific flat belt applications, such as conveyor belting and various other long length transport belting, lift belting used for elevators, garage doors, and other lifting systems, and the like. Other belt embodiments utilizing the hybrid cord are illustrated in FIGS. 8 and 9.

Figure 8:
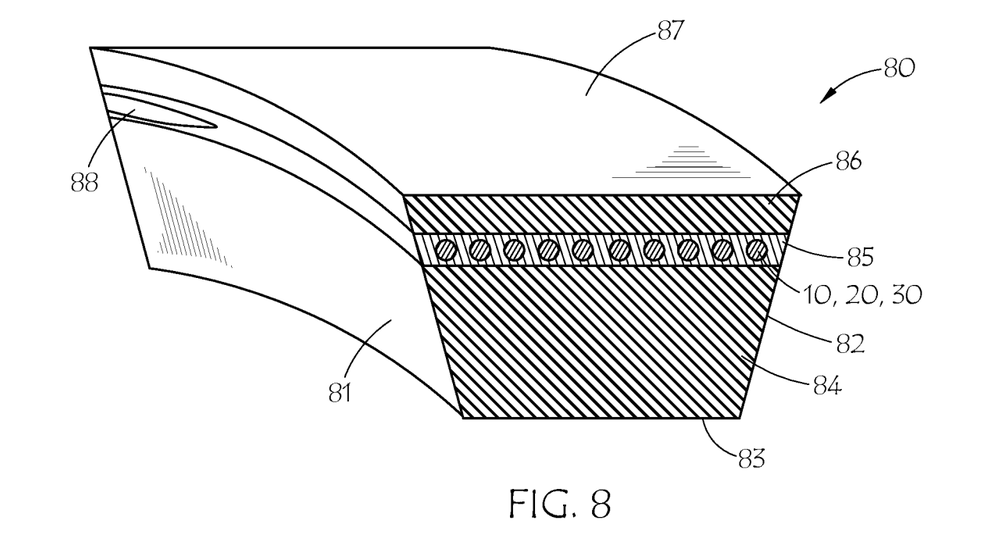
FIG. 8 is a partially fragmented view of a V-belt according to an embodiment of the invention.

FIG. 8 shows a portion of belt 80 in the form of a relatively wide V-belt, a configuration commonly used for variable speed applications. Any V-belt form, however, could use the hybrid cord. Variable speed applications and other high-load, heavy duty, or high speed applications may particularly benefit from the high strength and flexibility of the hybrid cord. In FIG. 8, V-belt 80 has opposing angled sides 81 and 82 which are the usual contact surfaces when the belt is engaged in a V-shaped pulley or sheave. Inner surface 83 and outer or backside surface 87 are shown as smooth, but either or both of these may be cogged, i.e. have a corrugated profile to improve flexibility or reduce noise. The helically wound hybrid cable 10, 20, or 30 may be embedded in an elastomeric adhesion layer 85, with a compression layer 84 under the cord layer and extension layer 86 over the cord layer. The layers 84, 85, and 86 may comprise any suitable elastomeric composition, fabric covers or embedded fabric layers or the like. When the hybrid cable reinforcement is helically wrapped in a slab-making process, followed by cutting into individual belts, there may be cut portions of cable exposed at the edge of the belt as shown by edge cord 88.

Figure 9:
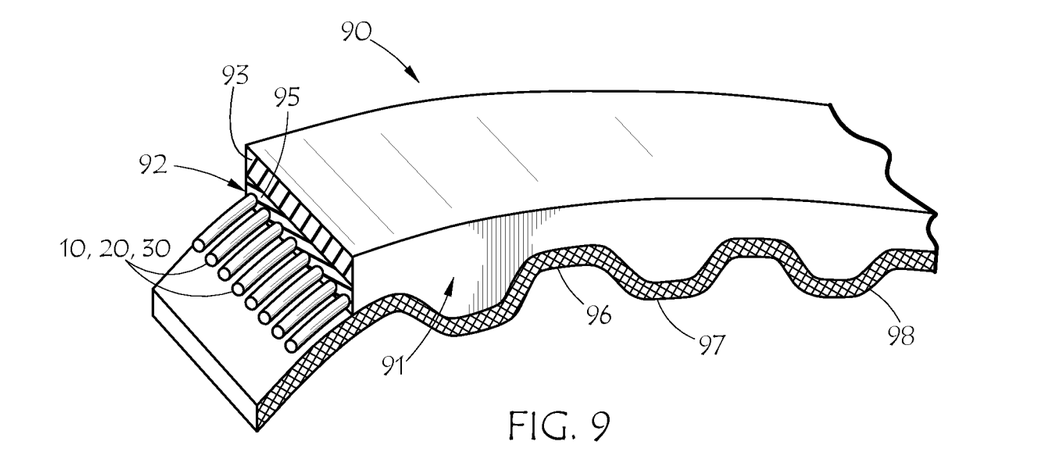
FIG. 9 is a partially fragmented view of a synchronous belt according to an embodiment of the invention.

FIG. 9 shows a portion of synchronous belt 90, also known as a toothed belt. Belt 90 includes tensile layer 92, which is made up of hybrid cable 10, 20, or 30 in embedded in elastomer compound 95. Belt 90 is shown with a different elastomer compound as the backside layer 93, although the same compound may be used throughout the belt. The belt body 91 may thus be of one compound, or have multiple materials and layers, according to the design of the belt. Belt 90 may have on one or both sides a series of transverse (or oblique) teeth 97 alternating with lands 96. The toothed surface is typically covered with a jacket 98 which may be a fabric or rubberized fabric or thermoplastic or combinations thereof.

For belt applications, depending on the belt size, any of the examples above may be utilized. The larger diameter cables such as Ex. 2, 8, or 9 could be suggested primarily for larger toothed belts, as large as a 32-mm pitch toothed belt or for the so-called "XH" or "XXH" tooth profiles, or for large agricultural equipment with variable speed V-belt drives. Ex. 2 and 4 could be suggested for medium sized industrial belts, such as a 14-mm pitch toothed belt or the "H" tooth profile. Some cable designs which may be suitable for smaller toothed belts are shown in TABLE 3. Ex. 11 is a hybrid cable with a 6 k carbon core and 0.25-mm diameter wire wrap, giving a final diameter of about 1.11 mm, in the range appropriate for automotive timing belts and "L" profile industrial toothed belts. The cable diameter could be reduced further by using smaller wire, for example by using 0.15-mm or 0.08-mm wire as the wrap. Ex. 11 may be compared to an all metal cable of similar overall diameter in Comp. Ex. 10. Ex. 13 is a smaller yet hybrid cable, using a 3 k carbon fiber core and a set of 0.08 wires wrapping the core. For track, Ex. 2 is an exemplary size for hybrid reinforcing cable, but again, the other examples may be used depending on the size or scale of the track and track-driven vehicle of the intended use.

Thus, for belts in general, the hybrid cable may advantageously have a carbon fiber core diameter in the range and the cable diameter may be in the range from about 0.3 mm up to about 6.00 mm, or from 0.5 to 1.5 mm, or 1-2 mm, or from 2-4 mm. 0.75 or 1.00 up to about 2.00 mm, and the single layer, wrap wire diameter may be in the range from 0.08 or 0.15 or 0.20 or 0.30 mm up to 0.5 or 0.6 or 0.7 or 0.80 mm. In belts, the hybrid cable may offer advantages over all-steel cable, such as lighter weight for reduced inertial forces at the same or higher tensile strength. The hybrid cable may offer advantages over all-carbon fiber cord, such as improved adhesion to the belt body elastomer (s) or improved tensile or other physical properties.

TABLE 3

|  | Comp. Ex. 10 | Ex. 11 | Comp. Ex. 12 | Ex. 13 |
| --- | --- | --- | --- | --- |
| Type | Wire rope | Hybrid cable | Wire rope | Hybrid cable |
| Construction[1] | 1 × 3 + 5 × 7 (0.15) | 6k + 10 (0.25) | — | 3k + 12 (0.08) |
| Core Diameter (mm) |  | 0.61 |  | 0.43 |
| Overall Diameter (mm) | 1.21 | 1.11 | 0.63 | 0.59 |
| Linear Density (g/m) | 5.4 | 4.5 | 1.8 | 0.77 |
| Weight savings (%) | — | 18 | — | 57 |
| Tensile Strength (kN) | 1.73 | 1.53 | 0.58 | 0.4 |

[1]wire diameter in parentheses is in mm.

A belt comprising a tensile member embedded in a polymeric body, said tensile member comprising a hybrid cable comprising a core and a wrap; the core comprising a treated, twisted, carbon fiber yarn or bundle of carbon fiber yarns; and the wrap comprising a plurality of metal wires helically wrapped around the core, the plurality of metal wires laid side by side without crossing each other.

The belt in the form of a power transmission belt, i.e. a toothed belt, a V-belt, a flat belt, or a multi-ribbed belt.

The belt in the form of a support belt for an elevator.

The belt wherein the wrap comprises a single layer of said plurality of solid metal wires.

The belt wherein the plurality of metal wires are laid side by side in a layer, generally filling the layer without space between wires.

The belt wherein the plurality of metal wires are laid side by side in a layer, not completely filling the layer and with some space between the wires.

The belt wherein the treatment comprises an elastomer solution or dispersion, such as an RFL, a latex, a primer, an ionomer or polyelectrolyte or combinations thereof.

The belt wherein the carbon fiber yarn of the core comprises a cabled construction of a plurality of carbon fiber yarns each twisted with a first twist multiplier in a first direction and then combined by twisting together with a second twist multiplier in a second direction.

The belt wherein the second direction is opposite the first direction.

The belt wherein the first and second twist multipliers are approximately equal, or the second is greater than the first, e.g. a ratio of second to first in the range of 2 to 6 or about 4 to 5.

A track for a vehicle drive comprising a hybrid cable comprising a core and a wrap; the core comprising a treated, twisted, carbon fiber yarn or bundle of carbon fiber yarns; and the wrap comprising a plurality of metal wires helically wrapped around the core, the plurality of metal wires laid side by side without crossing each other.

A cable-reinforced hose comprising a spiral wrapped reinforcement layer comprising a hybrid cable comprising a core and a wrap; the core comprising a treated, twisted, carbon fiber yarn or bundle of carbon fiber yarns; and the wrap comprising a plurality of metal wires helically wrapped around the core, the plurality of metal wires laid side by side without crossing each other.

The hose in the form of BOP hose, a choke and kill hose, a rotary drilling hose.

The hose wherein the wrap comprises a single layer of said plurality of solid metal wires.

The hose wherein the plurality of metal wires are laid side by side in a layer, generally filling the layer without space between wires.

The hose wherein the plurality of metal wires are laid side by side in a layer, not completely filling the layer and with some space between the wires.

The hose wherein the carbon fiber yarn of the core comprises a cabled construction of a plurality of carbon fiber yarns each twisted with a first twist multiplier in a first direction and then combined by twisting together with a second twist multiplier in a second direction.

The hose wherein the second direction is opposite the first direction.

The hose wherein the first and second twist multipliers are approximately equal, or the second is greater than the first, e.g. a ratio of second to first in the range of 2 to 6 or about 4 to 5.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A hybrid cable for reinforcing a composite article, comprising a core and a wrap; the core comprising a carbon fiber yarn or bundle of carbon fiber yarns and comprising a twist; and the wrap comprising a plurality of metal wires helically wrapped around and completely covering or almost completely covering the core, the plurality of metal wires laid side by side without crossing each other.

2. The hybrid cable of claim 1 wherein the wrap comprises a single layer of said plurality of metal wires.

3. The hybrid cable of claim 1 wherein the plurality of metal wires are laid side by side in a layer, filling the layer and completely covering the core without space between wires.

4. The hybrid cable of claim 1 wherein the plurality of metal wires are laid side by side in a layer, not completely filling the layer and covering the core with some space between the wires.

5. The hybrid cable of claim 1 wherein the core comprises a treatment comprising a polymer-based composition at least partially penetrating the interstices between the carbon fibers of the core.

6. The hybrid cable of claim 1 wherein the core comprises no treatment other than an optional sizing on the carbon fiber.

7. The hybrid cable of claim 1 wherein the carbon fiber yarn of the core comprises a cabled construction of a plurality of carbon fiber yarns each twisted with a first twist multiplier in a first twist direction and then combined by twisting together with a second twist multiplier in a second twist direction.

8. The hybrid cable of claim 7 wherein the second twist direction is opposite the first twist direction.

9. The hybrid cable of claim 8 wherein the first and second twist multipliers are approximately equal.

10. The hybrid cable of claim 8 wherein the direction of wrapping the wires is the same as the first twist direction.

11. The hybrid cable of claim 8 wherein the direction of wrapping the wires is the opposite of the first twist direction.

12. The hybrid cable of claim 1 wherein the core comprises a folded bundle of carbon fiber filaments or yarns.

13. The hybrid cable of claim 1 wherein the wire is carbon steel having a coating comprising brass, zinc, copper, tin, or a polymer.

14. The hybrid cable of claim 1 wherein the cable is coated with a polymeric coating.

15. The hybrid cable of claim 1 wherein the cable is uncoated.

16. A composite article comprising a polymeric body with a hybrid cable according to claim 1 embedded in the polymeric body; wherein the material of the polymeric body penetrates between the wires and is in contact with or penetrates into the core at least partially.

17. A cable-reinforced hose comprising a hybrid cable as claimed in claim 1 embedded in a polymeric hose body.

18. A belt comprising a tensile member embedded in a polymeric belt body, said tensile member comprising a hybrid cable as claimed in claim 1.

19. A track for a track-driven vehicle comprising a tensile member embedded in a polymeric body, said tensile member comprising a hybrid cable as claimed in claim 1.

20. The hybrid cable of claim 8 wherein the first and second twist multipliers are such that the second is greater than the first with a ratio of second to first in the range of about 2 to 6.

* * * * *